(12) United States Patent
Duneas

(10) Patent No.: US 7,030,163 B2
(45) Date of Patent: Apr. 18, 2006

(54) BIOCIDAL COMPOSITION

(75) Inventor: Nicolaas Duneas, Boksburg North (ZA)

(73) Assignee: Ipsilon Laboratories CC, Boksburg (ZA)

( * ) Notice: Subject to any disclaimer, the term of this patent is extended or adjusted under 35 U.S.C. 154(b) by 141 days.

(21) Appl. No.: 10/077,244

(22) Filed: Feb. 15, 2002

(65) Prior Publication Data

US 2004/0154999 A1 Aug. 12, 2004

Related U.S. Application Data

(63) Continuation-in-part of application No. PCT/IB00/01055, filed on Jul. 28, 2000.

(51) Int. Cl.
*A01N 33/12* (2006.01)
(52) U.S. Cl. .............. 514/635; 210/728; 210/736; 210/764; 252/180; 252/181; 514/642
(58) Field of Classification Search ............... 210/728, 210/735, 736, 755, 764; 252/180, 181; 422/28, 422/37; 514/635, 642
See application file for complete search history.

(56) References Cited

U.S. PATENT DOCUMENTS

| 4,952,398 | A | * | 8/1990 | Tapin .................... 504/121 |
| 5,030,659 | A | * | 7/1991 | Bansemir et al. ........... 514/635 |
| 5,529,713 | A | * | 6/1996 | Gauthier-Fournier ....... 510/384 |
| 5,668,084 | A | * | 9/1997 | Unhoch et al. ............. 504/158 |
| 5,935,518 | A | * | 8/1999 | Richard et al. ............. 422/28 |
| 6,103,666 | A | * | 8/2000 | Del Corral et al. ......... 504/160 |
| 6,180,584 | B1 | * | 1/2001 | Sawan et al. ............... 510/382 |
| 6,248,369 | B1 | * | 6/2001 | Nier et al. .................. 424/637 |

FOREIGN PATENT DOCUMENTS

| EP | 0457656 | 11/1991 |
| GB | 9852875 | 11/1998 |

* cited by examiner

*Primary Examiner*—Peter A. Hruskoci
(74) *Attorney, Agent, or Firm*—James Ray & Assoc.

(57) ABSTRACT

A biocidal composition includes, in combination, poly(hexamethylene)biguanide, didecyldimethylammonium chloride a homogenizing agent and a flocculating agent. The biocidal composition is used to treat water to control microorganisms.

14 Claims, No Drawings

BIOCIDAL COMPOSITION

This application is a Continuation-In-Part of PCT/IB00/01055, filed Jul. 28, 2000.

THIS INVENTION relates to a biocidal composition, to a method of treating water and to a method of controlling microorganisms.

The use of biguanide salts such as poly(hexamethylene) biguanide hydrochloride and tetraalkylammonium salts such as didecyldimethylammonium chloride in water purification is well known, for example WO98/52875, U.S. Pat. No. 5,030,659 and EP 0 457656. It has now been found that the effectiveness of a combination of didecyldimethylammonium chloride and poly(hexamethylene)biguanide can be substantially increased by including a polyquaternary amine in the composition.

The invention thus provides a biocidal composition which includes poly(hexamethylene)biguanide hydrochloride in an amount of between 1 and 510 g/l, didecyldimethylammonium chloride in an amount of between 10 and 510 g/l, an homogenising agent selected from alcohols, polyals and polyethylene ethers in an amount of 300–400 g/l and a polyquarternary amine coagulating agent.

The homogenising agent may also be an anti-foaming agent. Instead, the composition may include an additional anti-foaming agent.

The homogenising or solubilising agent may, for example, be selected from hexyleneglycol, propylene glycol, ethanol and mixtures of any two or more thereof. Hexylene glycol is 2-methylpentane-2,4-diol and is supplied by Protea Industrial Chemicals, a division of Prochem (Pty) Ltd of South Africa. The homogenising agent may, instead, be sorbitan hexatallate. In preferred embodiments of the invention the homogenising agent is a combination of propylene glycol and ethanol in a ratio of 1:1 or a combination of hexvlene glycol and sorbitan hexatallate of between about 1:1 and about 297.3. Sorbitan hexatallate is also called POE(40), or polyoxyethylene (40), sorbitan hexatallate and is marketed as LONZEST® HTO-40 by Lonza as an antifoaming agent. The product is described in Material Safety Data Sheet 8187 of Lonza. Both hexyleneglycol and sorbitan hexatallate act as anti-foaming agents.

The homogenising, or solubilising, agent allows the polymeric biguanide salt and the tetraalkylammonium salt to form a homogeneous solution or phase having a substantially higher concentration than can be obtained by dissolving the polymeric biguanide salt and the tetraalkylammonium salt in water in the absence of the homogenising agent.

The biocidal composition is effective in the control of microorganisms. For the purposes of this specification, the word "microorganism" should be construed to include within its meaning, and without being limited thereto, bacteria, fungi (including yeasts and moulds), algae in dormant, immature, developing or mature stages and viruses. Further, the words "control" and "controlling" should be broadly construed to include within their meaning, and without being limited thereto, inhibiting the growth or propagation of micro-organisms and killing microorganisms.

The didecyldimethylammonium chloride may, for example, be the product BARDAC 2250 or BARDAC 2280 which are manufactured by Lonza. BARDAC 2250 is provided as a 50% solution and BARDAC 2280 as an 80% solution.

The poly(hexamethylane)biguanide hydrochloride (also referred to as polymeric biguanide hydrochloride) may be the product marketed under the trade name Vantocil IB by Zeneca Biocides. The product is also known as polyhexamide and is provided as an aqueous solution having a concentration of about 20%. The flocculating agent may be an aluminium salt such as aluminium sulphate, a ferric salt such as ferric sulphate or ferric chloride, or any other cationic type of coagulant whether polymeric or monomeric. The polyquaternary amine acts both as a coagulating agent and as a filter aid. The polyquaternary amine may be poly(epichlorohydrin-dimethylamine). This polymer is also known as Epi/DMA and is made by condensation polymerisation and generally has a molecular weight of between about 10 000 and 100 000. In particular, the polyquaternary amine may be Montan Coagulant CPI.

The flocculating agent may thus be selected from aluminium salts ferrous salts and ferric salts. In particular the flocculating agent may be selected from aluminium sulphate, ferric sulphate and ferric chloride.

The biocidal composition may be in a form selected from liquids, emulsions, suspensions, concentrates, emulsifiable concentrates, slurries and solids.

Preferably, the concentration of the poly(hexamethylene) biguanide hydrochloride is between about 20 and 80 g/l. It is most preferably about 30 g/l. The concentration of the didecyldimethylammonium chloride in the liquid may be between about 10 and 510 g/l. Preferably, the concentration is between 80 and 180 g/l. It is most preferably about 120 g/l.

The flocculating agent may be an aluminium salt and the concentration of the aluminium salt in the composition may be about 60–120 g/l, preferably about 75 g/l. The concentration of the polyamine in the composition may be about 10–20 g/l and preferably about 15 g/l.

The composition may include about 300–400 g/l of the homogenising agent, preferably about 350 g/l. Preferably, if the concentration of the poly(hexamethylene)biguanide is about 30 g/l or less and the concentration of the didecyldimethylammonium chloride is about 120 g/a or less, the composition should comprise about 300 g/l of the homogenising agent.

Instead, the biocidal composition may be in the form of a solid. For example, the solid may be selected from finely divided powders and granular materials. The composition may be prepared by adsorbing the active ingredients onto a solid carrier material such as, but not limited to, dextrose, talcum powder, metal salts, metal carbonates, metal bicarbonates and the like.

Thus the solid material may include a carrier material selected from dextrose, talcum powder and metal salts.

In a preferred embodiment of the invention, a 2 l volume of the biocidal composition of the invention contains poly (hexamethylene)biguanide (300 g of a 20% (m/m) solution), didecyldimethylammonium chloride (300 g of an 80% (m/m) solution), hexyleneglycol (600 g), polyquaternary amine flocculating agent (30 g of a 30% (m/m) solution), aluminium sulphate (150 g) and sufficient water to provide a volume of 2 l. The hexyleneglycol may, in part, be replaced with sorbitan hexatallate. In a preferred embodiment, the hexyleneglycol is replaced with a mixture of hexyleneglycol (297 g) and sorbitan hexatallate (3 g). The actual amounts of these components present in 2 l of the formulation is thus about 60 g for the poly(hexamethylene)biguanide, about 240 g for the didecyldimethylammonium chloride and about 10 g for the polyamine flocculating agent.

According to another aspect of the invention, there is provided a method of treating water to control microorganisms, the method including the step of adding to the water a biocidal composition as hereinbefore described.

The method may include adding the biocidal composition to the water in an amount of between about 4 and 400 mg of the composition per litre of water and preferably between about 20 and 100 mg of the composition per litre of water and more preferably about 50 mg per litre of water.

The method may include the additional step of adding an oxidising agent to the water. The oxidising agent may be hydrogen peroxide or a hydrogen peroxide generating agent such as sodium perborate tetrahydrate.

The water will, typically, be circulating swimming pool water which is passed through a filter. However the water may, instead, be potable water, i.e. water for human consumption, water for agricultural use, the water of a cooling tower, the water of an air washer or scrubber system or an industrial fresh water supply provided that a filtration or sedementation/clarificate step is involved. In the case of potable water, the composition may be dosed into the water at 0.5–5.0 ppm using a dosing pump.

The actual amount of the biocidal composition or of the polylhexamethylene)biguanide hydrochloride, didecyldimethylammonium chloride and polyquaternary amine used will vary with the conditions and properties of the water being treated. Factors which will influence the amount used include the temperature, pH, total hardness, total dissolved solids content and the microbial load of the water. The determination of the amount of the biocidal composition or of the two salts required in a specific case will readily be determined by routine experimentation by a person skilled in the art.

According to another aspect of the invention there is provided a method of making a biocidal composition, the method including the step of combining poly(hexamethylene)biguanide hydrochloride, in an amount of between 1 and 510 g/l didecyldimethylammonium chloride in an amount of between 10 and 510 g/l, an homogenising agent selected from alcohols, polyols and polyethylene ethers in an amount of 300–400 g/l and a polyquaternary amine coagulating agent.

The method may include combining polyquaternary amine in an amount of 10–20 g/g.

The invention extends to a recreational circulating water system containing poly(hexamethylene)biguanide hydrochloride, didecylmethylammonium chloride, a homogenising agent selected from alcohols, polyols and polyethylene ethers and a polyquaternary amine coagulating agent.

The system may include a flocculating agent selected from aluminium salts, ferrous salts and ferric salts. The system may be a swimming pool.

Generally, if microorganisms are not controlled, particularly in aqueous systems, their unchecked growth can produce colonies extensive enough to give rise to problems such as biofilm blockage of heat exchange surfaces, clogging of components of water conveying equipment, unsightliness in swimming pools and health risks to users of such pools and the biocidal composition and method of the invention provides a simple method of inhibiting the formation or deposition of biofilms on surfaces in aqueous systems.

Surprisingly, the Applicant has found that the combination of poly(hexamethylene)biguanide hydrochloride with didecyldimethylammonium chloride and a polyquaternary amine has a synergistic effect in that the combination of these components has a substantially greater anti-microbial effect than has been found with the prior art combinations of polymeric biguanide and tetraalkylammonium salts.

The invention is now described, by way of example, with reference to the accompanying Examples and Tables.

EXAMPLE 1

Preparation of the Composition

In order to prepare 1000 l of the composition, i.e. sufficient for 500 2 l bottles, aluminium sulphate (75 kg) was dissolved in a mixing tank, with stirring, in water (300 ). Hexyleneglycol (300 g) was then added to the aluminium sulphate solution. Poly(hexamethylene)biguanide, as a 20% (m/m) aqueous concentrate (150 kg) and didecyldimethylammonium chloride, as an 80% (m/m) aqueous concentrate (150 kg) were then added to the solution and the mixture was stirred. The polyquaternary amine flocculating agent poly (epichlorohydrin-dimethylamine), as a 30% (m/m) aqueous concentrate (15 kg) and, optionally, a colourant were added to the mixture with stirring to provide the biocidal composition having a volume of approximately 1000 l. In other embodiments, the hexyleneglycol was replaced with a hexyleneglycol sorbitan hexatallate mixture having a ratio of 1:1 or 297:3 or with sorbitan hexatallate.

EXAMPLE 2

A swimming pool having a capacity of 40 000–50 000 l was dosed with a biocidal composition comprising 240 g of didecyldimethylammonium chloride, 60 g poly(hexamethylene)biguanide hydrochloride, 160 g of aluminium sulphate, 24 g of the polyquaternary amine poly(epichlorohydrin-dimethylamine), 594 g of hexyleneglycol and 6 g of sorbitan hexatallate. Although the concentration of the composition was high, no excessive foaming took place. The water was allowed to circulate through the filter without an automatic pool cleaner, After 24 hours a powdery film (suspended solids) had accumulated at the bottom of the pool and was removed by vacuuming. The number of colony-forming units, the coliform count and the *E. Coli* count were monitored over a period of 25 days. The results of the test are set out in Table 1. As can be seen from the table, the total number of colony-forming units declined from 1 970 to zero whilst the couiform count and *E. Coli* counts both remained at zero.

TABLE 1

| DAY | COLONY COUNT | COLIFORM COUNT | *E. COLI* COUNT |
|---|---|---|---|
| 1 | 1970 | 0 | 0 |
| 4 | 10 | 0 | 0 |
| 20 | 0 | 0 | 0 |
| 25 | 0 | 0 | 0 |

EXAMPLE 3

A swimming pool having a capacity of 40 000–50 000 l was dosed with a biocidal composition comprising 240 g of didecyldimethylammonium chloride, 60 g of poly(hexamethylene)biguanide hydrochloride, 150 g of aluminium sulphate, 24 g of the polyamine compound poly (epichlorohydrin-dimethylamine), 594 g of hexyleneglycol and 6 g of sorbitan hexatallate. Again although the concentration of the composition was high, no excessive foaming took place. The water was allowed to circulate through the filter without an automatic pool cleaner. After 24 hours a powdery film (suspended solids) had accumulated at the bottom of the pool and was removed by vacuuming. The number of colony-forming units, the coliform count and the *E. Coli* count were monitored over a period of 18 days. The results of the test are set out in Table 2. As can be seen from the table, the total number of colony-forming units declined from 40 to 25 whilst the coliform count and *E. Coli* counts both remained at zero.

TABLE 2

| DAY | COLONY COUNT | COLIFORM COUNT | *E. COLI* COUNT |
|---|---|---|---|
| 1 | 40 | 0 | 0 |
| 4 | 42 | 0 | 0 |
| 10 | 4 | 0 | 0 |
| 18 | 25 | 0 | 0 |

EXAMPLE 4

A swimming pool having a capacity of 50 000 l was dosed with a composition containing 240 g of didecyldimethylammonium chloride, 60 g of poly(hexamethylenebiguanide hydrochloride, 150 g of aluminium sulphate, 600 g of hexylene glycol and 24 g of the polyamine compound poly(epichlorohydrin-dimethylamine). The water was allowed to circulate through the filter without an automatic pool cleaner for the first two days, thereafter an automatic pool cleaner was connected for the duration of the experiment which lasted for four weeks from the date of dosing. After twenty-four hours, the sedimentation was removed by vacuum cleaning. The number of colony forming units in the water of the swimming pool was measured before and after dosing and weekly during the duration of the experiment. The results of the test are set out in

TABLE 3

| DAY | COMMENT | COLONY FORMING UNITS |
|---|---|---|
| 0 | Before dosing | 1250 |
| Week 1 | 24 hours after dosing | 1 |
| Week 2 | | 0 |
| Week 3 | | 9 |
| Week 4 | | 520 (day 22) |

As can be seen from Table 3, the number of colony forming units dropped from 1250 to zero and then increased to 520 in week 4. In week 5 the water was clear and no algal growth had occurred.

COMPARATIVE EXAMPLE 5

Two swimming pools, each having a capacity of 40 000–50 000 l were dosed with a biocidal composition comprising 240 g of didecyldimethylammonium chloride, 60 g of poly(hexamethylene)biguanide hydrochloride, 150 g of aluminium sulphate and 600 g of hexyleneglycol. Although the concentration of the composition was high, no excessive foaming took place. The water was allowed to circulate through the filter without an automatic pool cleaner. After 24 hours a powdery film (suspended solids) had accumulated at the bottom of the pool and was removed by vacuuming. The resulting water was clear. The number of colony-forming units present in the water of the swimming pools was monitored for a period of 24 days. The results of the test are set out in Table 4 below.

In another embodiment of the invention, the composition comprised 320 g of the didecyldimethylammonium chloride and 80 g of the poly(hexamethylene)biguanide hydrochloride.

The numbers in the columns headed "Pool 1" and "Pool 2" are the numbers of colony-forming units present in the water of the two swimming pools. Pool 1 was used daily by two children and on week-ends by two adults. Pool 2 was not used during the period of the test. As can be seen from the Table, the number of colony-forming units dropped to zero on the third day after addition of the biocidal composition. On the 14th day heavy rainfall and garden run-off increased the number of colony-forming units in Pool 1 to 500 000 and in Pool 2 to 1 160. The number of colony forming units in Pool 1 then steadily dropped to a value of 1 000 on the 30th day whilst the number of colony-forming units in Pool 2 rose to 2 100 by the 30th day. The water in both pools was clear on days 10, 18 and 30.

TABLE 4

| DAY | POOL 1 | POOL 2 |
|---|---|---|
| 1 | 4040 | 156000 |
| 2 | 4 | 2 |
| 3 | 0 | 0 |
| 10 | 0 | 98 |
| 14 | 500000 | 1160 |
| 30 | 1000 | 2100 |

COMPARATIVE EXAMPLE 6

A swimming pool having a capacity of 40 000–50 000 l was dosed with a biocidal composition comprising 240 g of diciecyldimethylammanitim chloride and 60 g of poly(hexamethylene)biguanide hydrochloride, 150 g of aluminiumn sulphate and 600 g of hexyleneglycol. Although the concentration of the composition was high, no excessive foaming took place. The water was allowed to circulate through the filter without an automatic pool cleaner. After 24 hours a powdery film is (suspended solids) had accumulated at the bottom of the pool and was removed by vacuuming. The number of colony-forming units, the coliform count and the *E. Coli* count were monitored over a period of 24 days. The results of the test are set out in Table 5. As can be seen from the table, the total number of colony-forming units increased from 2 to 3 500 over the period of the test.

TABLE 5

| DAY | COLONY COUNT | COLIFORM COUNT | *E. COLI* COUNT |
|---|---|---|---|
| 1 | 2 | 0 | 0 |
| 4 | 17 | 0 | 0 |
| 20 | 800 | 0 | 0 |
| 24 | 3500 | 0 | 0 |

As can be seen from Examples 2–4 and Comparative Examples 5 and 6, in the presence of the polyquaternary amine (Examples 2–4), both the coliform count and the *e-coli* count remained at 0 for up to twenty-five days and the number of colony forming units after 3–4 weeks was between 0 and 520. In the comparative examples in the absence of the polyquaternary amine (Examples 4 and 5), the number of colony forming units increased to as much as 2100 after thirty days.

DISCUSSION

There is a general world-wide trend to the use of chlorine-free disinfectants for the treatment of recreational water. This has come about as a result of a growing negative perception concerning the use of strong oxidants such as free chlorine or free bromine in the purification of recreational water. There has been a corresponding growth in the use of methods which do not involve chlorine, such as ozonation and UV irradiation. The Applicant has found, surprisingly, that a combination of didecyldimethylammonium chloride and poly(hexamethylene)biguanide hydrochloide with an homogenising agent and a polyquaternary amine has a synergistic biocidal effect.

The polyquaternary amine of the biocidal composition of the invention acts both as a coagulating agent and as a filter aid. The co-administration of the polyquaternary amine allows a reduction in the amount of didecyldimethylammoniurm chloride and the poly(hexamethylene)biguanide salt which would otherwise be required for effective biocidal activity. In general, didecyldimethylammonium chloride and poly(hexamethylene)biguanide are progressively removed from a circulating water system, such as the water of a swimming pool, as they become bound to organic debris and suspended solids. They are then caught in the sand filter and back washed out of the system. The rate at which the didecyldimethylammonium chloride and poly(hexamethylene)biguanide are depleted from the circulating water system is accordingly directly related to the concentration of suspended microorganisms and organic debris in the water.

The co-administration of a polyquaternary amine coagulating agent results in the following advantages. polyquarternary amines are positively charged and have a higher charge density than didecyldimethylammonium chloride or poly(hexamethylene)biguanide and accordingly compete with these compounds for negatively charged sites on cell membranes and organic debris. In effect, this increases the amount of free didecyldimethylammonium chloride and poly(hexamethylene)biguanide available in the system. As a result of its high positive charge density I the quaternary polyamine binds to negatively charged sites on cell debris or organic debris. Neutralization of these surface charges reduces repulsive forces between the particles so that agglomeration can occur. This results in an increase in average suspended particle diameter and entrapment in the filter with concomitant removal from the system. In systems with a high level of suspended organics in the form of cells and cell debris, there is a correspondingly high chemical demand for didecyldimethylammonium chloride and poly(hexamethylene)biguanide. The removal of this debris from the water system by the polyquaternary amine coagulating agent accordingly reduces consumption of the didecyldimethylammonium chloride end poly(hexamethylene)biguanide. This reduction in consumption of the didecyldimethylammonium chloride and the poly(hexamethylene) biguanide results in a substantial increase in the period required between doses of the composition compared with the corresponding period in respect of prior art compositions as well as a reduction in the dosage level required.

Laboratory experiments have shown that a combination of didecyldimethylammonium chloride at a concentration of 6 ppm and poly(hexamethylene)biguanide at a concentration of 1.5 ppm and polyquaternary at a concentration of 0.2–0.5 ppm completely eliminates viable *E. Coli* levels of 35000–70000/ml within 3 hours. In field trials, the Applicant has found that the biocidal composition is long acting and that sanitary pool water conditions can be maintained for 4–16 weeks following a single dose of the composition in an open water system. This is a substantial improvement on the performance of prior art compositions of which the Applicant is aware.

It is an advantage of the invention illustrated that it provides a biocidal composition which need be used only once per month. A single dose has been found to maintain sanitary pool conditions for a full month. The biocidal composition of the invention was found to completely eliminate bacteria within 24 hours of dosing and to maintain low total colony-forming units for up to a month. The pools tested were also found to be free from algae during the test period.

The Applicant has found that the biocidal composition of the invention is effective in inhibiting bacteria such as *Eschericia coli, Psoudomonas aeruginose* and *Staphylococcus aureus* and the Applicant expects the composition to be effective against bacteria and fungi including *Penicillium* species, *Saccharomyces* species, *Candida* species, *Fuserium* species and *Aspergillus* species.

It is a further advantage of the invention illustrated that the biocidal composition is highly concentrated and substantially less of the composition of the invention needs to be used to treat a given volume of water than is the case with prior art formulations of which the Applicant is aware. The Applicant has found that, where prior art compositions require 15–20 or more litres to treat a given volume of water, the more concentrated biocidal composition of the invention is effective when only 2 litres are used. The high concentration is produced because of the homogenising or solubilising effect of the glycol or glycol alcohol mixture. The Applicant has found that ten times more of the poly(hexamethylene)biguanide and the didecyldimethylammonium chloride can be dissolved to form the composition than would be the case in the absence of the homogenising agent. In the absence of the homogenising agent, the volume of the composition added to a swimming pool would have to be about 20 l. This would clearly present a serious marketing problem as few people would be willing to buy a 20 l container, or sufficient smaller containers, to provide 20 l of composition in order to treat a domestic swimming pool. The 2 l a volume of the invention which is required to treat a domestic swimming pool is thus a major advantage of the invention. Furthermore, in the absence of the homogenising agent foaming resulting from the addition of 20 l of composition would be so excessive as to affect the activity of the active components of the composition. The pool would also be temporarily unusable. It is also an advantage of the invention illustrated that the composition includes a flocculating or coagulating component. The presence of a flocculating or coagulating component results, in addition, in at least partial removal of suspended and dissolved solids. Prior art biocidal compositions of which the Applicant is aware also tend to cause substantial foaming in open water systems. However, the glycol present in the composition of the invention acts as an anti-foaming agent. This permits small volumes of the highly concentrated composition to be added to an open-water system to maintain the purity of the water for a period of between 14 and 60 days without extensive foaming taking place. Prior art algicides known to the Applicant control algae but do not control bacteria. The use of such prior art algicides therefore requires the additional use of an oxidiser such as pool chlorine to act as a biocide. It is an advantage of the biocidal composition of the invention that the composition acts as an algicide, biocide, fungicide and viricide simultaneously.

The invention claimed is:

1. A biocidal composition which includes poly(hexamethylene)biguanide hydrochloride in an amount of between 1 and 510 g/l, didecyldimethylammonium chloride in an amount of between 10 and 510 g/l, an homogenising agent selected from alcohols, polyols and polyethylene ethers in an amount of 300–400 g/l and a polyquatenary amine coagulating agent including poly(epichlorohydrin-dimethylamine) in an amount effective to increase free poly(hexamethylene)biguanide hydrochloride and didecyldimethylammonium chloride available in a circulating water system.

2. A biocidal composition as claimed in claim 1, which includes a flocculating agent selected from aluminium salts, ferrous salts and ferric salts.

3. A biocidal composition as claimed in claim 1, in which the homogenising agent is selected from hexyleneglycol, propylene glycol, ethanol and mixtures of any two or more thereof.

4. A biocidal composition as claimed in claim 2, in which the flocculating agent is selected from aluminium sulphate, ferric sulphate and ferric chloride.

5. A biocidal composition as claimed in claim 1, in which the concentration of the poly(hexamethylene)biguanide hydrochloride is between 20 and 80 g/l.

6. A biocidal composition as claimed in claim 5, in which the concentration of the poly(hexamethylene)biguanide hydrochloride is about 30 g/l.

7. A biocidal composition as claimed in claim 1, in which the concentration of the didecyldimethylammonium chloride is between 80 and 180 g/l.

8. A biocidal composition as claimed in claim 7, in which the concentration of didecyldimethylammonium chloride is about 120 g/l.

9. A biocidal composition as claimed in claim 1, in which the composition includes about 350–400 g/l of the homogenising agent.

10. A biocidal composition as claimed in claim 1, in which the concentration of the polyquaternary amine coagulating agent is between 10 and 20 g/l.

11. A biocidal agent as claimed in claim 10, in which the concentration of the polyquaternary amine coagulating agent is about 15 g/l.

12. A method of making a biocidal composition, the method including the step of combining poly(hexamethylene)biguanide hydrochloride in an amount of between 1 and 510 g/l, didecyldimethylammonium chloride in an amount of between 10 and 510 g/l, an homogenising agent selected from alcohols, polyols and polyethylene ethers in an amount of 300–400 g/l and a polyquaternary amine coagulating agent including poly(epichlorohydrin-dimethylamine) in an amount effective to increase free poly(hexamethylene)biguanide hydrochloride and didecyldimethylammonium chloride available in a circulating water system.

13. A method as claimed in claim 12, which includes combining the polyquaternary amine coagulating agent in an amount of 10–20 g/l.

14. A method as claimed in claim 13 which includes combining a flocculating agent selected from aluminium salts, ferrous salts and ferric salts with the poly(hexamethylene)biguanide hydrochloride, didecylmethylammonium chloride, homogenising agent and polyquaternary amine coagulating agent.

* * * * *